United States Patent
Kresse

(10) Patent No.: US 8,571,771 B2
(45) Date of Patent: Oct. 29, 2013

(54) TRANSMISSION TURBINE ACCELERATION CONTROL FOR MANAGING VEHICLE ACCELERATION

(75) Inventor: John P. Kresse, Martinsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/562,802

(22) Filed: Jul. 31, 2012

(65) Prior Publication Data

US 2012/0296538 A1 Nov. 22, 2012

Related U.S. Application Data

(62) Division of application No. 12/034,753, filed on Feb. 21, 2008, now Pat. No. 8,275,528.

(51) Int. Cl.
*G06F 7/00* (2006.01)

(52) U.S. Cl.
USPC .................. 701/54; 701/37; 701/70; 701/90

(58) Field of Classification Search
USPC ............. 701/54, 1, 37, 70, 90; 180/197, 282
See application file for complete search history.

(56) References Cited

U.S. PATENT DOCUMENTS

| | | | |
|---|---|---|---|
| 4,070,927 A | 1/1978 | Polak | |
| 5,468,198 A | 11/1995 | Holbrook et al. | |
| 5,601,506 A | 2/1997 | Long et al. | |
| 6,021,370 A | 2/2000 | Bellinger et al. | |
| 6,134,499 A | 10/2000 | Goode et al. | |
| 6,202,021 B1 | 3/2001 | Kresse et al. | |
| 6,282,482 B1 | 8/2001 | Hedstrom | |
| 6,370,462 B1 | 4/2002 | Speicher et al. | |
| 6,726,596 B2 | 4/2004 | Kresse et al. | |
| 6,980,898 B2 * | 12/2005 | Hosler et al. | 701/51 |
| 7,101,313 B2 | 9/2006 | Kresse et al. | |
| 2005/0137770 A1 | 6/2005 | Hosler et al. | |
| 2006/0014606 A1 | 1/2006 | Sporl et al. | |
| 2006/0089775 A1 * | 4/2006 | Whitton et al. | 701/51 |
| 2007/0112495 A1 | 5/2007 | Murray | |

FOREIGN PATENT DOCUMENTS

| | | |
|---|---|---|
| DE | 10356194 | 7/2005 |
| EP | 0339664 A | 11/1989 |
| EP | 1391341 A | 2/2004 |
| WO | WO 2006119850 | 11/2006 |

OTHER PUBLICATIONS

European Search Report for Application No. 09000786.5, dated Oct. 29, 2009, 6 pages.
European Search Report for Application No. EP12004051, dated Aug. 10, 2012, 3 pages.

* cited by examiner

*Primary Examiner* — Thomas Black
*Assistant Examiner* — Luke Huynh
(74) *Attorney, Agent, or Firm* — Barnes & Thornburg LLP

(57) ABSTRACT

Methods and systems for managing acceleration of a motor vehicle having an automatic transmission by controlling transmission turbine acceleration are provided. A desired transmission turbine acceleration is determined based on vehicle speed, turbine speed, and other information obtained from the vehicle transmission. One or more torque limits are determined as a function of the turbine acceleration. The torque limits are applied to manage acceleration of the vehicle.

20 Claims, 14 Drawing Sheets

| RANGE \ CLUTCH | C1 | C2 | C3 | C4 | C5 |
|---|---|---|---|---|---|
| 1ST | X |  |  |  | X |
| 2ND | X |  |  | X |  |
| 3RD | X |  | X |  |  |
| 4TH | X | X |  |  |  |
| 5TH |  | X | X |  |  |
| 6TH |  | X |  | X |  |
| R |  |  | X |  | X |
| N |  |  |  |  | X |

FIG. 4

TRANSMISSION TURBINE ACCELERATION CONTROL FOR MANAGING VEHICLE ACCELERATION

CROSS-REFERENCE TO RELATED APPLICATIONS

This application is a divisional of and claims priority to U.S. patent application Ser. No. 12/034,753, filed Feb. 21, 2008, which is incorporated herein by this reference in its entirety.

BACKGROUND

It is possible, in a variety of circumstances, for a vehicle operator to over-accelerate a vehicle or for the vehicle to otherwise enter a state of non-optimal acceleration. Excessive, unnecessary, or otherwise non-optimal acceleration may occur as a result of driver behavior, vehicle load, vehicle operating conditions, or a combination of these and/or other factors. Excessive, unnecessary, or otherwise non-optimal vehicle acceleration tends to reduce fuel economy and may cause increased wear on one or more of the vehicle powertrain components over time. Consequently, instances of non-optimal acceleration are likely to be a concern to vehicle owners, drivers, and manufacturers of the powertrain and/or driveline components (e.g., engine, transmission, drive wheels, etc.).

Prior art systems that focus on the use of engine parameters, such as U.S. Pat. No. 6,021,370, to Bellinger et al., have proven to be difficult to integrate with automatic transmission control systems to effectively manage vehicle acceleration.

SUMMARY

This disclosure describes methods and systems for controlling transmission turbine acceleration in order to manage vehicle acceleration. Through the use of the disclosed methods of applying transmission turbine acceleration rates to vehicle acceleration control, efforts to improve the fuel economy of a vehicle may be concentrated in the transmission system and may be implemented independently of the vehicle engine system and other powertrain components. As such, they may be used in place of or in addition to engine acceleration management techniques. Also, due to their modular nature, they may be supplied for factory installation in new vehicles and also may be included in aftermarket transmission products or may be retrofitted for older vehicle designs.

In one embodiment, a control module for a motor vehicle is provided. The control module includes a processor and circuitry configured to receive a turbine speed from an automatic transmission of a motor vehicle, receive a vehicle speed from the vehicle, determine a desired transmission turbine acceleration limit based on the transmission turbine speed and the vehicle speed, generate a transmission input torque limit based on the desired transmission turbine acceleration limit, and output the transmission input torque limit to manage acceleration of the vehicle.

The determining a desired transmission turbine acceleration limit process may include determining a desired vehicle acceleration based on the vehicle speed. The determining a desired vehicle acceleration process may include selecting a vehicle speed-vehicle acceleration relationship table from a plurality of predetermined vehicle speed-vehicle acceleration relationship tables. The determining a desired transmission turbine acceleration limit process may include determining a transmission output speed to vehicle speed ratio. The determining a desired transmission turbine acceleration limit process may include determining a gear ratio. The determining a desired transmission turbine acceleration limit may include multiplying the gear ratio by the transmission output speed to vehicle speed ratio by the desired vehicle acceleration. The generating the transmission input torque limit process may include determining a vehicle mass.

The control module may be a transmission control module coupled to the automatic transmission of the motor vehicle and outputting the transmission input torque limit may include outputting the transmission input torque limit to another control module of the vehicle.

A transmission for a motor vehicle is also provided, including a torque conversion apparatus couplable to a vehicle mover, a gear arrangement operably coupled to the torque conversion apparatus, an electro-mechanical gear control assembly operably coupled to the gear arrangement, and a control module operable to control operation of the transmission. The control module includes a processor and circuitry configured to receive a first value representative of a transmission turbine speed, determine a second value representative of a desired transmission turbine acceleration based on the first value, compute at least one torque limit as a function of the second value, and output the torque limit to manage acceleration of the vehicle. The vehicle mover may include an engine and a motor, and the control module may be adapted to compute a first torque limit, output the first torque limit for use by the engine, compute a second torque limit, and output the second torque limit for use by the motor.

In another embodiment, a transmission for a motor vehicle is provided, including a fluid coupling coupleable to a vehicle engine. The fluid coupling includes a pump driven by the vehicle engine, a transmission turbine, optionally (if the fluid coupling is a torque converter) a stator between the pump and turbine, a gear arrangement operably coupled to the fluid coupling, a valve assembly operably coupled to the gear arrangement and to the fluid coupling, and a control module operable to control operation of the transmission. The transmission control module includes a processor and circuitry configured to receive a turbine speed, determine a measured turbine acceleration based on the turbine speed, compute a torque limit as a function of the desired turbine acceleration, and output the torque limit for use by another control module to manage acceleration of the vehicle. The control module may be adapted to compute a first torque limit, output the first torque limit for use by an engine of a hybrid vehicle, compute a second torque limit, and output the second torque limit for use by a motor of the hybrid vehicle.

A computer program product, for controlling transmission turbine acceleration to manage acceleration of a motor vehicle, is also provided. The computer program product includes instructions embodied in a tangible medium. The computer instructions are executable by a controller to receive data representative of a transmission turbine speed and a current vehicle speed, select a vehicle acceleration mode by determining at least one of whether a vehicle operator is requesting the vehicle to move forward and whether a low torque condition is present, and calculate at least one transmission input torque limit based on the selected vehicle acceleration control mode.

If the vehicle acceleration control mode indicates that a shift is in progress, the instructions may include calculating at least one transmission input torque limit using a feedforward component and a ramp component. If the vehicle acceleration mode indicates a low torque condition, the instructions may include calculating at least one transmission input torque limit using a feedforward component and may not include a ramp component and may not include a feedback component.

If the vehicle acceleration mode does not indicate that a shift is in progress and does not indicate a low torque condition, the instructions may include calculating at least one transmission input torque limit using a feedforward component and a feedback component.

The step of calculating the at least one transmission input torque limit may include selecting a gain region based on a transmission output speed to vehicle speed ratio and transmission torque ratio and adjusting a feedback loop gain based on the selected gain region. The feedback component may include a proportional term based on the selected gain region. The feedback component may include an integrator.

The instructions may include determining whether the gain region has changed from a first gain region to a second gain region based on the transmission output speed to vehicle speed ratio and the transmission torque ratio and adjusting the integrator if the gain region has changed. The instructions may include applying wind-up logic to the integrator if the gain region has not changed. The instructions may include determining a current transmission range and disabling acceleration control if the range is not forward.

A method implemented in computer circuitry for managing acceleration of a motor vehicle having an automatic transmission is also provided. The method includes receiving a plurality of data signals from an automatic transmission of a vehicle, determining a current vehicle speed, determining a desired turbine acceleration based only on the vehicle speed and the data signals received from the automatic transmission, and converting the desired turbine acceleration to at least one torque limit to be applied by the vehicle to manage acceleration of the vehicle.

Patentable subject matter may include one or more features or combinations of features shown or described anywhere in this disclosure including the written description, drawings, and claims.

BRIEF DESCRIPTION OF THE DRAWINGS

The detailed description refers to the following figures in which:

FIG. 4 is a table indicating a relationship between transmission clutch activation and corresponding speed ratio, relating to the embodiment of FIG. 3;

DETAILED DESCRIPTION

Aspects of the present invention are described with reference to certain illustrative embodiments shown in the accompanying drawings and described herein.

Figure 1:
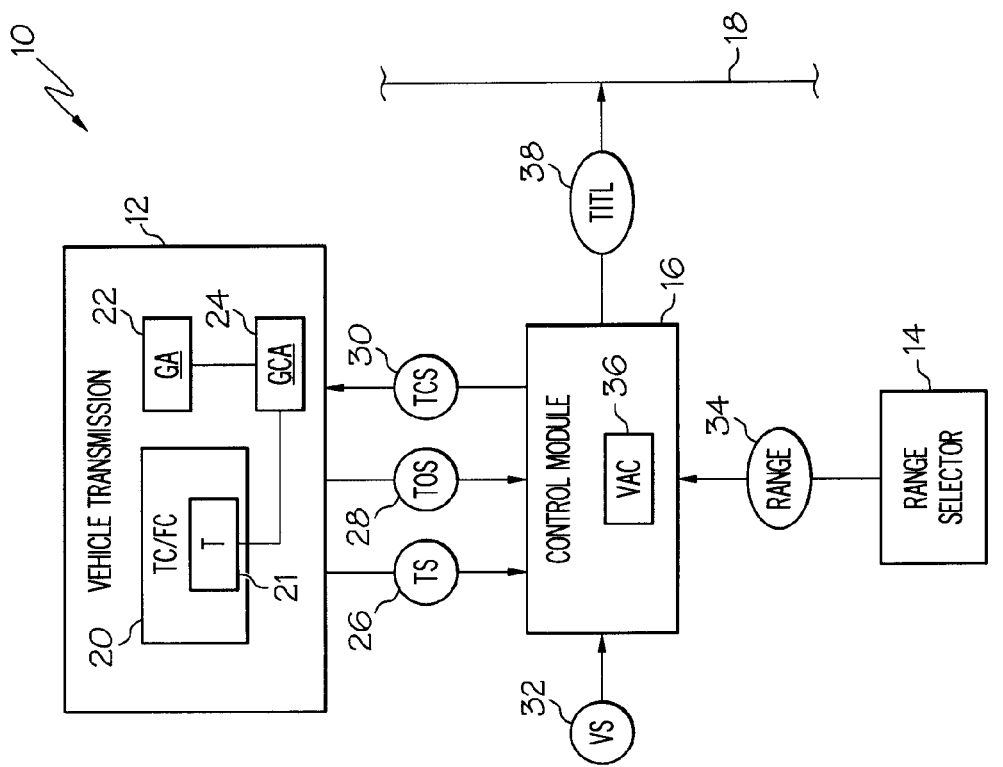
FIG. 1 is a simplified schematic of an automatic transmission system for a vehicle including an automatic transmission, a range selector, a control module configured to execute one or more of the disclosed methods, and communication links.

A vehicle transmission system 10 includes, generally, a vehicle transmission 12, a control module 16, and a range selector 14 as shown in FIG. 1. Transmission 12 receives torque output from a vehicle mover, such as a source of rotational power, i.e., an internal combustion engine and/or electric motor, and converts it to a torque output that is useful to operate the vehicle, through the use of gears and selectively engageable friction devices, such as clutches and brakes, which are typically controlled by an assembly of electromechanical or electro-hydraulic control elements including a pressure source, shift valve, solenoid control valves and pressure control valves.

Transmission 12 includes a torque converter or fluid coupling 20, which operably couples the transmission 12 to a vehicle's engine; a gear arrangement 22, and a gear control assembly, electro-hydraulic control assembly or "valve body" 24. Various electrical, mechanical, and hydraulic linkages are used to interconnect various transmission system components, as will be understood by those skilled in the art.

Torque converter or fluid coupling 20 generally includes an impeller or pump (not shown) and a turbine 21, which, in combination with other transmission components, are operable to convert output torque received from the vehicle engine or other "mover" of the vehicle to a transmission output torque usable to drive or propel the vehicle load. It will be understood by those skilled in the art that a slipping clutch or other similar friction device that may be pre-set to a specific torque level, may be used in place of a fluid coupling. In embodiments where a slipping clutch is used, the output speed/acceleration of the clutch is representative of or analogous to the turbine speed/acceleration and the acceleration control is adapted to receive the clutch output speed/acceleration data. The term "torque conversion apparatus" may be used herein to refer to any one of a fluid coupling, torque converter, slipping clutch or other device or apparatus of similar function.

In general, the pump is connected to the engine flywheel and is rotated by the engine crankshaft. When the transmission is in gear, torque is transferred from the engine to the transmission input shaft by the motion of fluid in the torque converter. The turbine is connected to the transmission input shaft and rotates at the same speed as the input of the transmission, thereby affecting the actual vehicle speed.

In vehicles equipped with a torque converter rather than a simple fluid coupling, a stator is generally interposed between the pump and the turbine to achieve torque multiplication, particularly when there is a substantial difference between input and output rotational speed. In some embodiments, the torque converter may include multiple turbines and stators to produce different amounts of torque multiplication. Also, a lockup clutch 47 may be provided. The lockup clutch 47 may be engaged, to lock the turbine and pump together, when the turbine and pump are rotating at or about the same speed and the torque converter is acting more or less as a simple fluid coupling, with little, if any, torque multiplication. Such application of the lockup clutch 47 may improve transmission efficiency since power transmission is mechanical rather than fluidic when lockup clutch 47 is engaged. Lockup clutch 47 may also be known as a torque converter clutch and may be a solenoid that operates to lock the torque converter electronically.

During operation of a vehicle, the transmission turbine accelerates or decelerates at a rate that is appropriate in view of the desired vehicle acceleration and the state of vehicle operation. For example, if a vehicle is turned on but "at rest" (i.e. due to application of the brake or being in "park" or "neutral"), when the transmission is put into gear, there will initially be a very large difference between the pump speed and the turbine speed. This difference will begin to decrease as the inertia of the vehicle load is overcome. The higher the turbine acceleration rate, the faster the inertia will be overcome and the faster the turbine speed will approach the pump speed. It is therefore desirable to find a way to control the rate of transmission turbine acceleration to manage the rate of vehicle acceleration.

Control module or computer 16 includes microprocessor- or controller-based electrical circuitry configured to interface with transmission 12 to receive and process a variety of information in the form of analog or digital electrical signals from sensors and/or switches positioned with respect to components of transmission 12 to gather data from or relating to the different components of transmission 12, and output transmission control signals 30 to control operation of various components of transmission 12. Each such sensor or switch may be any device that is operable to obtain the desired transmission parameter and provide a corresponding signal to the control module 16. Control module 16 may additionally output control signals to other components of the powertrain or of the vehicle, via one or more datalinks 18. In embodiments where control module 16 is integrated with the transmission 12, it may be referred to as the "transmission control module" (TCM).

Range selector 14 is operable to initiate shifting of the vehicle from one gear range to another, for example, from park to forward, forward to neutral, neutral to reverse, and the like. Range selector 14 may include a manual selector wherein the vehicle operator manually or mechanically initiates a range change, e.g. by moving a lever from one position to another. Alternatively or in addition, range selector 14 may include an electronically-controlled range selector wherein the vehicle operator depresses a button or switch to initiate the range change, or a range change is automatically initiated by control module 16 or another vehicle control module, such as a cruise control system, upon detection by the transmission of an increase or decrease in vehicle speed resulting from driver or vehicle system behavior (such as an increase or decrease in force applied to the accelerator pedal or brake, receipt of an accelerate, decelerate, or coast command from a cruise control system, or the like). In general, range changes initiate changes in the valve body 24 (for example, opening, closing, or changing valve positions), which operate to engage and/or disengage various components (i.e. gears and clutches) of the gear assembly 24 according to the design and operation of the particular transmission.

In accordance with the present invention, control module 16 is configured to include a vehicle acceleration control or VAC 36. VAC 36 receives from transmission 12 at least a transmission turbine speed signal 26 indicative of a current rotational speed of the transmission turbine and a transmission output speed signal 28 indicative of a current rotational speed of the transmission output shaft. Turbine speed 26 and transmission output speed 28 are generally rotational speeds that may be sensed, in terms of revolutions per minute, for example, by suitable sensors, such as a Hall effect sensor or a variable reluctance sensor. As such, signals 26, 28 are generally varying frequency signals.

Control module 16 also receives one or more signals indicative of a range value 34 from range selector 14. Range signals 34 indicate the current range in which the vehicle is operating, i.e., forward, reverse, neutral, or otherwise, and may also indicate whether a shift is currently in progress, i.e., whether a range change has been initiated but not yet completed.

Control module 16 also receives information indicative of a current speed of the vehicle 32. The indicator of vehicle speed may be sensed or derived from vehicle parameters and/or other vehicle data. For example, vehicle speed 32 may be sensed using a rotational speed sensor and provided electronically to control module 16. Vehicle speed 32 may alternatively or in addition be derived from other sensed parameters such as transmission output speed and other factors, using known calculations.

Control module 16 is configured to execute computer operations provided by VAC module 36 to determine, based on transmission turbine speed 26, transmission output speed 28, vehicle speed 32 and range indicator(s) 34, a transmission input torque limit 38, which provides a maximum torque limit such that transmission turbine acceleration, and therefore, vehicle acceleration, will not exceed a desired maximum acceleration limit. Transmission input torque limit 38 is output by control module 16 to a communication link 18.

Communication link 18 may be a hardwired electrical connection or a vehicle communications network such as a Controller Area Network or other suitable type of wireless or wired communications link, network or protocol. The transmission input torque limit 38 is thereby provided to one or more other components or control modules of the motor vehicle as needed or desired. The transmission input torque limit 38 may be provided using the J1939 communications protocol promulgated by the Society of Automotive Engineers, or other suitable protocol or standard, as will be understood by those skilled in the art.

In one embodiment, control module 16 operates to control operation of both the vehicle transmission and the vehicle engine. In such embodiment, the transmission input torque limit 38 is calculated as an engine torque limit and provided directly to the engine. The engine then responds as needed to manage vehicle acceleration. Other embodiments involving communication of the transmission input torque limit 38 to other vehicle control modules are shown in FIGS. 2-4 and described below.

Figure 2:
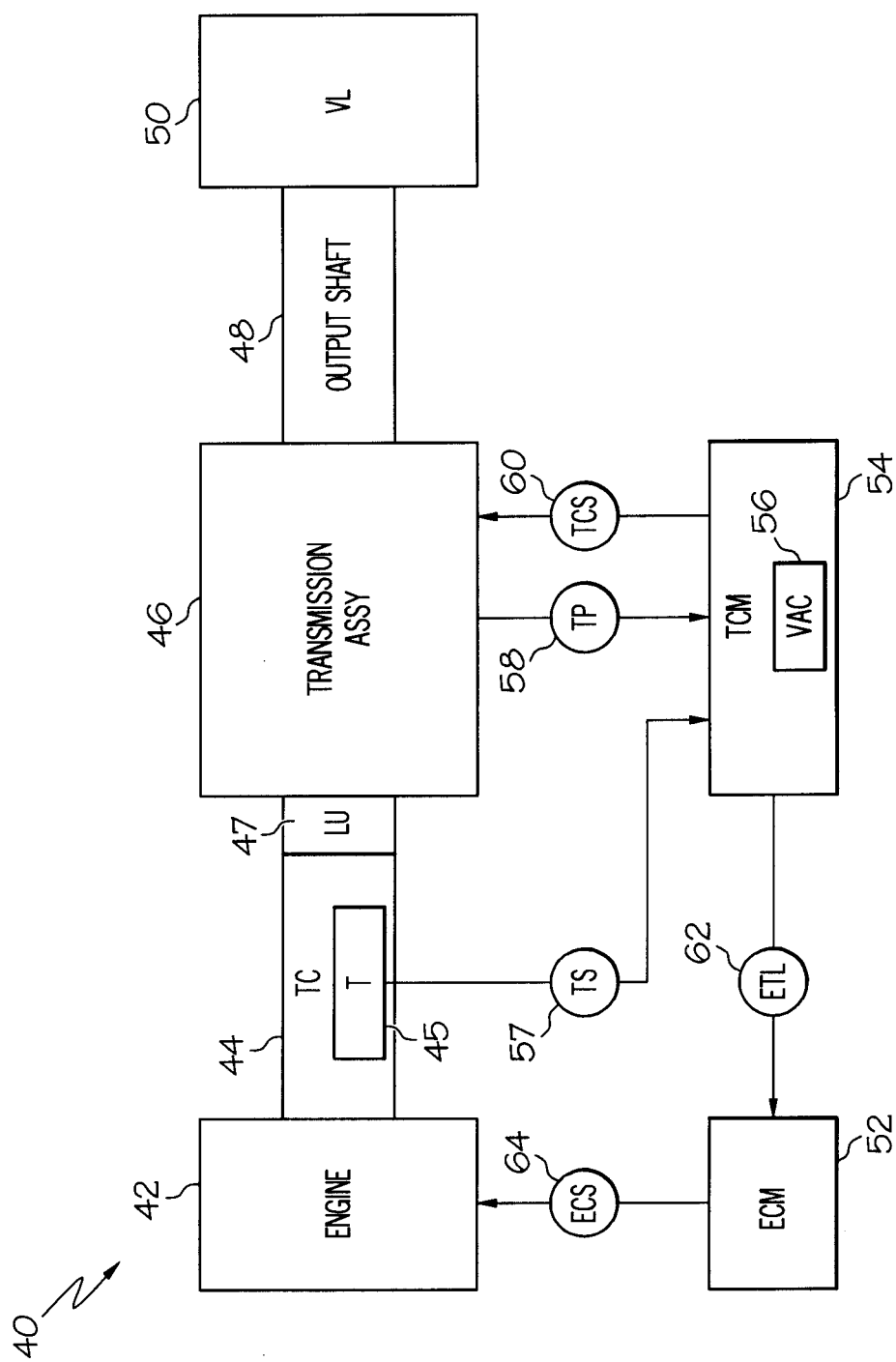
FIG. 2 is a simplified schematic of an exemplary motor vehicle powertrain in connection with which one or more of the disclosed methods may be used, including an engine, an automatic transmission, a transmission control unit, and an engine control unit.
Figure 3:
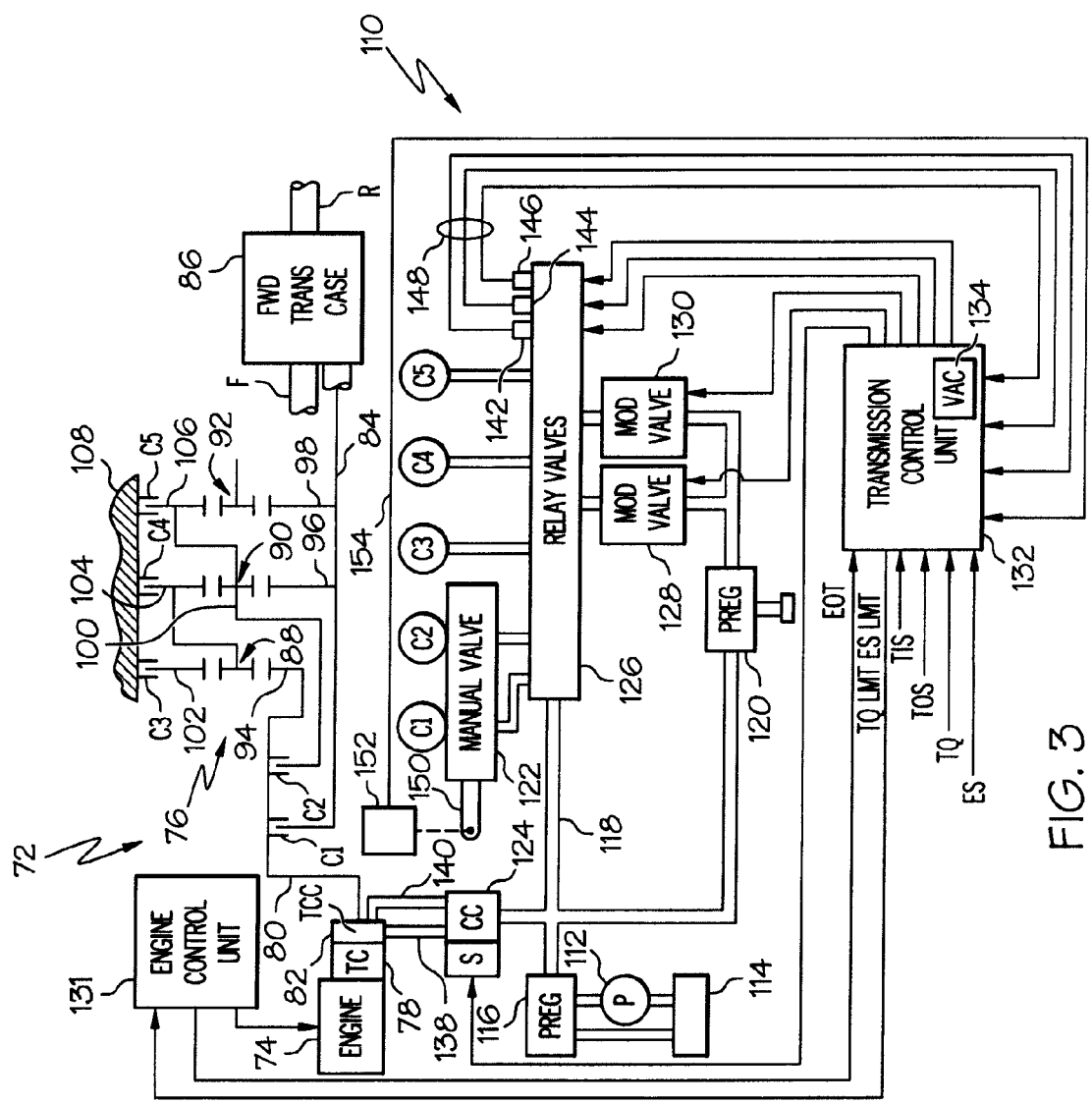
FIG. 3 is a schematic of an illustrative embodiment of a motor vehicle powertrain of the type of FIG. 2; showing an engine, an engine control unit, a torque converter, a torque converter clutch, a transmission control unit, a planetary gear arrangement and a hydraulic-electric control system including a manual valve.

FIG. 2 is a simplified illustration of an embodiment of a vehicle powertrain 40 including an engine 42, a torque converter 44 including a turbine 45, a lockup clutch 47, a turbine speed sensor 49, a transmission assembly 46, a transmission output shaft 48, a vehicle load 50, a transmission control module 54, and an engine control module 52. In general, transmission control module 54 controls the transmission using sensors from the motor vehicle and data provided by other vehicle control modules, including the engine control module 52. For instance, transmission control module 54 may be configured to, among other things, determine which gear to use or when to change gears for optimum vehicle performance. Various electrical, mechanical and hydraulic linkages interconnect the components of the powertrain 40 as will be understood by those skilled in the art.

Transmission control module 54 is operable to receive data signals from turbine speed sensor 49 and other components of the powertrain 40. TCM 54 is configured to send and receive data and instructional signals to and from transmission components 46, and to send data or instructional signals to engine control module 52.

Engine control module 52 is operable to receive data or instructional signals from transmission control module 54 and send instructional signals to engine 42. Although not shown, engine control module 52 may also be configured to receive data signals from engine 42 representative of engine parameters and to send data or instructional signals to transmission control module 54.

In accordance with the present invention, transmission control module 54 is configured to receive a turbine speed signal 57 indicative of a current transmission turbine speed, from turbine speed sensor 49, and to receive transmission parameters 58, including a transmission output speed, from transmission assembly 46, send transmission control signals 60 to transmission assembly 46 to control operation of transmission assembly 46 or components thereof, execute computer instructions of a vehicle acceleration control module 56 to determine a maximum desired turbine acceleration rate, and output the maximum desired turbine acceleration rate in the form of an engine torque limit 62 to engine control module 52.

Since the torque converter 44 and lockup clutch 47 are in parallel, turbine speed sensor 49 is operably coupled to the torque converter 44 and the lockup clutch 47. When the lockup clutch 47 is not engaged, then the torque converter 44 is transferring all of the torque from the engine 42 to the transmission 46. When the lockup clutch 47 is engaged, the lockup clutch 47 is transferring all of the torque from the engine 42 to the transmission 46. When the lockup clutch 47 is applying or releasing, both converter 44 and lockup 47 are doing some of the work. The turbine speed sensor 49 is therefore positioned to take readings from the torque converter 44, the clutch 47, or both the torque converter 44 and the clutch 47. As such, the turbine speed sensor 49 correctly measures the turbine speed whether or not the lockup clutch is fully or partially engaged. Because of the sensor location, it is still providing accurate measurements during lockup operations.

Engine control module 52 is configured to receive the engine torque limit 62. In the illustrated embodiment, engine torque limit 62 is output by transmission control module 54 according to the J1939 standard and engine control module 52 is configured to support the J1939 standard. Engine control module 52 may pass the torque limit 62 on to engine 42 or may use the torque limit 62 in the preparation of other engine control signals 64, which engine control module 52 sends to engine 42, during the course of operation of the vehicle.

In general, all data and instructional signals referred to in this disclosure, including but not limited to signals 57, 58, 60, 62, and 64 shown in FIG. 2, are of an electrical (i.e. analog or digital) form and are transmitted, broadcast, or otherwise communicated by a suitable form of communication link, such as a hardwired electrical connection or a vehicle communications network such as a Controller Area Network or other suitable type of wireless or wired communications link or network. Where data and instructions are communicated between or among powertrain components, such as between the transmission and the engine, a suitable communications protocol or standard (such as J1939) may be used to facilitate interoperability of components made by different manufacturers.

Control modules described herein generally include electrical circuitry and may include one or more microprocessors, controllers, microcontrollers, and communications interfaces (such as a port, bus and/or network interface), as well as tangible media (such as computer memory or storage media in any suitable form including ROM, RAM, compact flash, memory sticks, memory cards, optical storage media such as CD-ROMs, and the like) for storing, temporarily or permanently as needed, data, tables, charts, graphs, input, computed or derived values, programs, processes, logs, executable instructions, calculations, software, and the like, which are part of the computer programs, processes and operations of the control module. For example, in one embodiment, executable instructions implementing the vehicle acceleration control methods of the present invention are written using the 'C' programming language and are stored in nonvolatile memory of the control module.

FIG. 3 illustrates one embodiment of a vehicle drivetrain 72 of the type of FIG. 2, including a transmission control unit 132 having a vehicle acceleration module 134 in accordance with the present invention. Motor vehicle powertrain 72 includes an internal combustion engine 74 (such as a spark ignited engine or diesel engine) and an automatic transmission 76. The transmission 76 may be of the type described in U.S. Pat. No. 4,070,927 to Polak, incorporated herein by this reference, and may have an electro-hydraulic control of the type described in U.S. Pat. No. 5,601,506 to Long et al., incorporated herein by this reference.

The engine 74 is coupled to an input shaft 78 of transmission 76 through a fluidic torque converter (TC) 80 that is provided with a clutch (TCC) 82 that is selectively engaged to establish a mechanical coupling. The transmission output shaft 84 is coupled to the driving wheels of the vehicle in one of several conventional ways. The illustrated embodiment depicts a four-wheel-drive (FWD) application in which the output shaft 84 is connected to a transfer case 86 that is also coupled to a rear drive shaft R and a front drive shaft F. Typically, the transfer case 86 is manually shiftable to selectively establish one of several drive conditions, including various combinations of two-wheel-drive and four-wheel drive, and high or low speed range, with a neutral condition occurring intermediate the two and four wheel drive conditions.

The transmission 76 has three interconnected planetary gearsets, designated generally by the reference numerals 88, 90 and 92. The input shaft 78 continuously drives a sun gear 94 of gearset 88, selectively drives the sun gears 96, 98 of gearsets 90, 92 via clutch C1, and selectively drives the carrier 100 of gearset 90 via clutch C2. The ring gears 102, 104, 106 of gearsets 88, 90, 92 are selectively connected to ground 108 via clutches C3, C4 and C5, respectively.

The state of the clutches C1-C5 (i.e., engaged or disengaged) can be controlled to provide six forward gears (1, 2, 3, 4, 5, 6), a reverse gear (R) or a neutral condition (N) as shown in FIG. 4. In the illustrated embodiment, only clutch C5 is engaged during the neutral (N) condition; a neutral-to-drive range shift is carried out by engaging clutch C1 to establish the first forward gear, and a neutral-to-reverse range shift is carried out by engaging clutch C3 to establish the reverse (R) gear.

The torque converter clutch 80 and the transmission clutches C1-C5 are controlled by an electro-hydraulic control system, generally designated by the reference numeral 110. The hydraulic portions of the control system 110 include a pump 112 which draws hydraulic fluid from a reservoir 114, a pressure regulator 116 which returns a portion of the pump output to reservoir 114 to develop a regulated pressure in line 118, a secondary pressure regulator valve 120, a manual valve 122 activated by a driver-manipulated range selector (e.g., 14) (FIG. 1) via linkage arm 150 and a number of solenoid operated fluid control valves 124, 126, 128, 130.

An engine control unit (ECU) 131 and a transmission control unit (TCU) 132 are provided as two separate modules in the embodiment of FIG. 3. Both control units 131, 132 include microprocessor-based electrical circuitry. The ECU 131 controls the operation of engine functions such as fuel, spark timing, and so on depending on the control variables afforded by engine 74, and the TCU 132 controls the solenoid operated fluid control valves 124, 126, 128, 130 based on a number of inputs to achieve a desired transmission speed ratio. The inputs to TCU 132 include signals representing the transmission input speed or turbine speed TIS, engine speed ES, accelerator pedal position APP, transmission output speed TOS, and cruise control status CRUISE. Sensors for developing such signals may be conventional in nature, and have been omitted for simplicity. TCU 132 includes a vehicle acceleration module 134, which determines a transmission input torque limit in accordance with the present invention and supplies a torque limit command TQ_LMT to ECU 131 to limit the transmission input torque to manage vehicle acceleration.

The linkage arm 150 of manual valve 122 is coupled to a sensor and display module 152 that produces an diagnostic signal on line 154 based on the control lever position; such signal is conventionally referred to as a PRNDL signal, since it indicates which of the transmission ranges (P, R, N, D or L) has been selected by the range selector (e.g., 14) (FIG. 1). The fluid control valves 126 are provided with pressure switches 142, 144, 146 for supplying diagnostic signals to TCU 132 on lines 148 based on the respective relay valve positions. The TCU 132, in turn, monitors the various diagnostic signals for the purpose of electrically verifying proper operation of the controlled elements.

The solenoid operated fluid control valves 124, 126, 128, 130 are generally characterized as being either of the on/off or modulated type. To reduce cost, the electro-hydraulic control system 110 may be configured to minimize the number of modulated fluid control valves, as modulated valves are generally more expensive to implement. To this end, the relay valves 126 comprise a set of three on/off valves that are utilized in concert with manual valve 122 to enable controlled engagement and disengagement of each of the clutches C1-C5 with only two modulated valves 128, 130. For any selected gear, TCU 132 activates a particular combination of relay valves 126 for coupling one of the modulated valves 128, 130 to the on-coming clutch, and the other modulated valve 128, 130 to the off-going clutch. The modulated valves 128, 130 each comprise a conventional pressure regulator valve biased by a variable pilot pressure that is developed by current controlled force motor. The converter clutch valve (CC) 124 is also a modulated valve, and controls the supply fluid supply path to converter clutch 82 in lines 138, 140 for selectively engaging and disengaging the converter clutch 82. In addition to executing the vehicle acceleration control 134 and other processes, the TCU 132 determines pressure commands for smoothly engaging the on-coming clutch while smoothly disengaging the off-going clutch, develops corresponding force motor current commands, and then supplies current to the respective force motors in accordance with the current commands.

In general, the transmission assembly shown in FIG. 3 is configured for a light commercial vehicle. Aspects of the present invention may also be implemented for use in medium or heavy transmissions (such as "fly by wire" transmissions). In such other embodiments, manual valve 132 may be removed and replaced with an electronic control, such as an electrically or electronically controlled solenoid valve. In addition, the methods and systems of the present invention may be implemented for use in a vehicle having a hybrid transmission.

Figure 5:
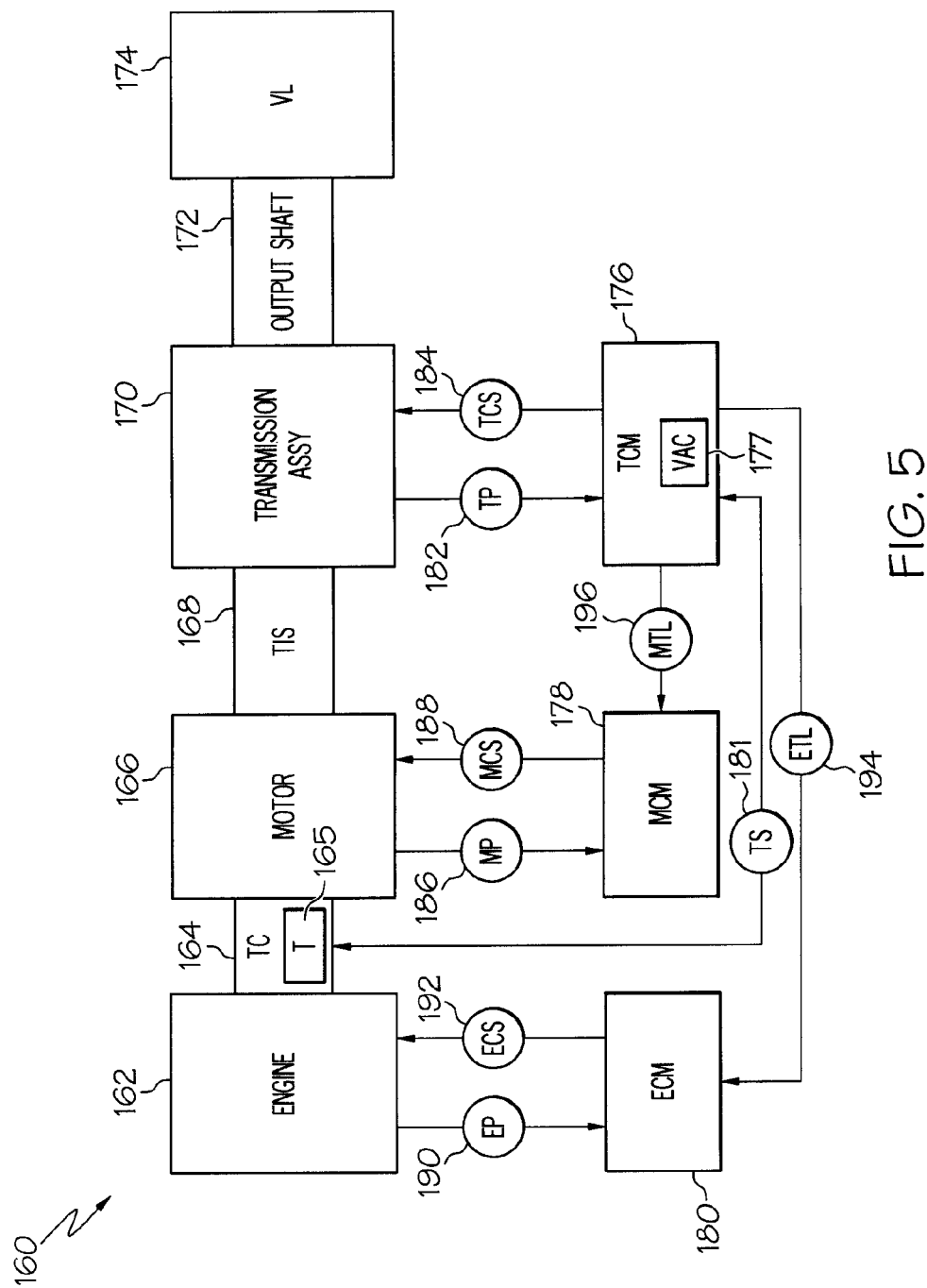
FIG. 5 is a simplified schematic of another exemplary motor vehicle powertrain in connection with which one or more of the disclosed methods may be used, including an engine, a motor, an automatic transmission, a transmission control unit, an engine control unit, and a motor control unit.

A simplified example of one such embodiment, wherein the engine and motor are connected to the transmission in series, is shown in FIG. 5. In other embodiments, a hybrid vehicle drivetrain may have an engine and an electric motor connected to the transmission in parallel, or may have features of both series and parallel systems. Other embodiments may also use pneumatic, hydraulic and mechanical components instead of electrical components. Also, it will be understood that configuration of the transmission assembly may vary according to the transmission type, for example, different gear configurations may be used (i.e. different types of planetary gearsets and/or different numbers of planetary gears and/or clutches).

In FIG. 5, hybrid drivetrain 160 includes an engine 162, a torque converter or fluid coupling 164 including a pump (not shown) and a turbine 165, an electric motor 166, a transmission input shaft 168, a transmission assembly 170, a transmission output shaft 172, a vehicle load 174 (including drive wheels, axles, etc.), a transmission control module 176 including a vehicle acceleration control 177, a motor control module 178 and an engine control module 180. It will be understood by those skilled in the art that motor 166 may alternatively be located between engine 162 and torque converter 164.

In general, transmission control module 176 receives a variety of transmission parameters 182, including transmission output speed, from sensors and/or switches positioned on or in transmission assembly 170 and sends transmission control signals 184 to transmission assembly 170 to control operation of the transmission assembly 170 as described above. Motor control module 178 is configured to receive motor parameters 186, such as motor speed, from motor 166 and send motor control signals 188 to motor 166 to control operation of motor 166. Engine control module 180 is configured to receive engine parameters 190, such as engine speed, from engine 162 and send engine control signals 192 to engine 162 to control the operation of engine 162.

Vehicle acceleration control 177 is configured to determine a desired transmission turbine acceleration rate based on turbine speed signals 181 received from turbine speed sensor 165 and transmission output speed signals received from transmission assembly 170. Vehicle acceleration control 177 converts the desired transmission turbine acceleration rate into a motor torque limit 196 and an engine torque limit 194, and sends these torque limits to motor control module 178 and engine control module 180, respectively.

Torque limits 194, 196, to the internal combustion engine and hybrid motor, are partioned as follows: the VAC limit to each is proportional to the propulsive torque being produced by each. For example, if all propulsive torque is being produced by the engine then the VAC limit is sent exclusively to the engine. If both engine and hybrid motor are each producing 50% of the current propulsive torque (e.g., each currently producing 150 Nm) and the VAC limit is calculated to be 200 Nm, then 50% of the VAC limit (100 Nm) is sent to the engine and 50% (e.g., 100 Nm) to the hybrid motor.

Motor control module 178 and engine control module 180 may send the torque limits on to motor 166 and engine 162, or may perform further processing of the torque limits to produce motor control signals 188 and/or engine control signals 192 to control acceleration of the vehicle or control other aspects of the operation of the motor 166 and/or engine 162.

A control for managing vehicle acceleration using transmission turbine acceleration (VAC) includes a functional block 212, wherein a desired turbine acceleration limit (DTAL) is determined based on a plurality of inputs, a feedforward component 214, and a proportional integral feedback component 216, 218. VAC is thereby configured to output one or more transmission input torque limits 220 for use by an engine control unit or other component of the vehicle to manage vehicle acceleration.

Figure 8:
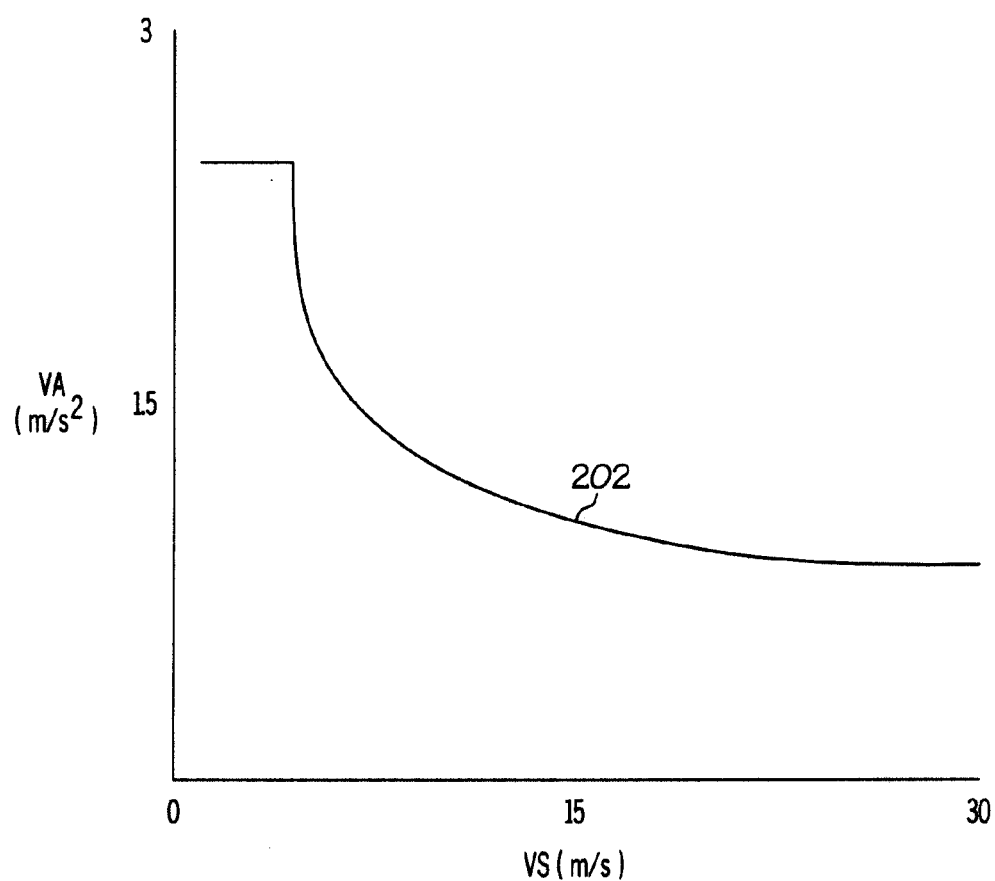
FIG. 8 is a graph illustrating an example of a desired relationship between vehicle acceleration and vehicle speed.
Figure 9:
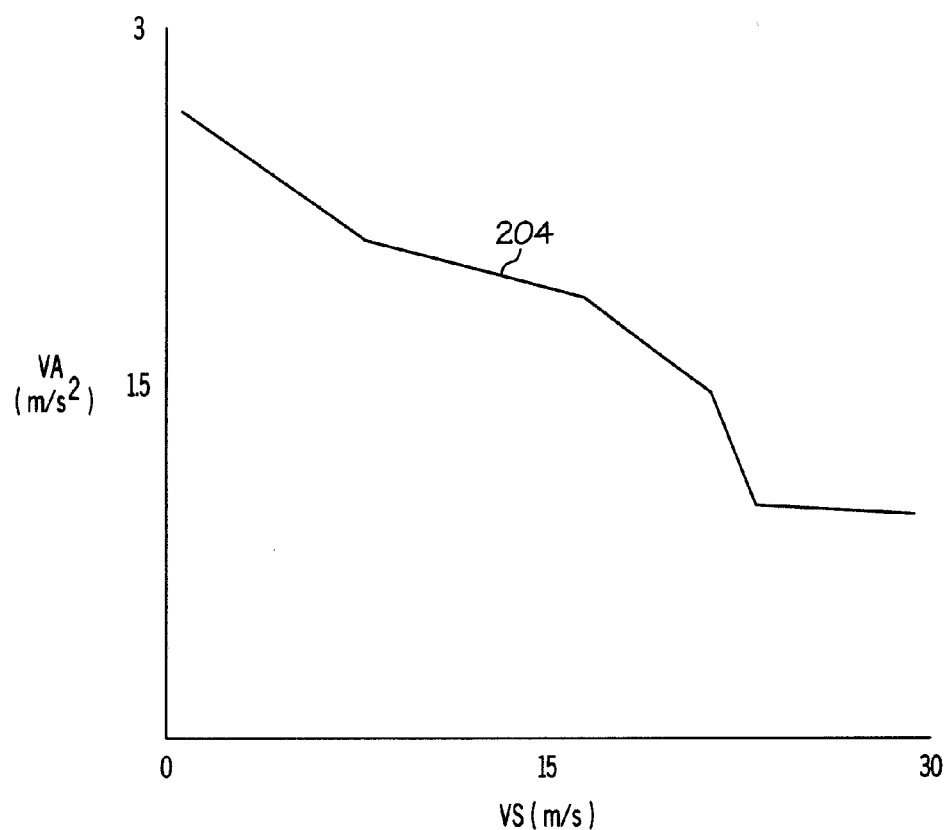
FIG. 9 is a graph illustrating another example of a desired relationship between vehicle acceleration and vehicle speed.

The desired turbine acceleration limit 212 is determined based on a plurality of inputs, including a maximum desired vehicle acceleration or vehicle acceleration limit (MDVA), transmission output speed (TOS), vehicle speed (VS) and gear ratio (GR). To determine desired turbine acceleration limit (DTAL) 212, an MDVA is selected based on the current vehicle speed, as shown by functional block 206 of FIG. 7. The MDVA is obtained from a database or lookup table or similar suitable computer program structure that is representative of a desired vehicle acceleration curve. Examples of such curves are shown in FIGS. 8 and 9.

In the illustrated embodiment, a desired vehicle acceleration curve is selected and once the desired curve is selected, a corresponding MDVA database or lookup table is programmed into the VAC for the particular vehicle. Selection of the desired vehicle acceleration curve may be done by the customer, i.e. the vehicle owner, operator, or manufacturer, or by the transmission or engine manufacturer or provider. The desired vehicle acceleration curve may be preprogrammed into the VAC system (e.g., at the factory) or may be selected and configured at any time "on the fly" based on anticipated or actual driving conditions, vehicle parameters, operator conditions, owner concerns, or other factors. As such, a new or revised lookup table may be installed or activated, through known computer software configuring or updating techniques, to be used by the VAC. Once the desired vehicle acceleration curve is selected, computer logic reads a current vehicle speed value, obtains a corresponding maximum desired vehicle acceleration according to the selected curve, and outputs the MDVA to functional block 226 of FIG. 7. The MDVA is then translated to a maximum desired turbine acceleration limit (DTAL) through further calculations as shown in FIG. 7 and described below.

The current vehicle speed is generally obtained from a physical sensor positioned on the drivetrain and transmitted to the VAC in the form of an electrical signal as described above. Alternatively, the vehicle speed signal may be obtained from the engine control module (e.g. via a data link) or may derived from other information available to the transmission control module, such as the transmission output speed. As will be understood by those skilled in the art, digital signal processing techniques may be applied as needed to prepare the vehicle speed information for use by the VAC. In the illustrated embodiment, vehicle speed is represented in terms of velocity, in units of meters per second (m/s).

Figure 7:
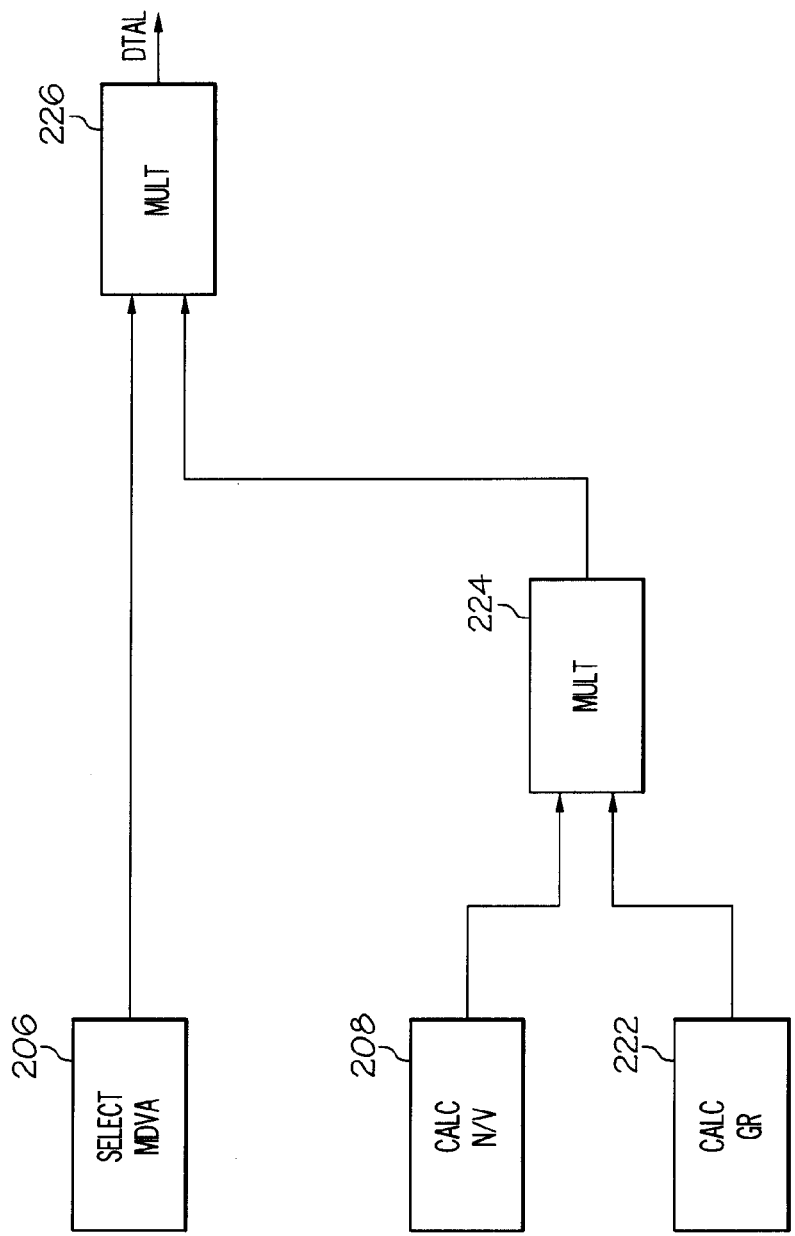
FIG. 7 is a flow diagram illustrating operations executable to determine a desired turbine acceleration limit value in the method of FIG. 6

At functional block 208 of FIG. 7, the transmission output speed to vehicle speed ratio or "N/v" value is calculated. The transmission output speed (TOS) is obtained from a transmission sensor as described above, and the vehicle speed (VS) is obtained or derived by one of the methods described above. The N/v ratio is then calculated by dividing TOS by VS.

For example, in one embodiment, parameters relating to N are stored, along with the corresponding N value, in non-volatile memory so that N can be "learned" over time based on one or more of these other parameters. Such other parameters may include: a vehicle speed threshold (i.e. if vehicle speed exceeds 50 kilometers per hour), an indicator of whether the vehicle is in a four wheel drive configuration or a low torque situation, and an axle revolutions per kilometer threshold (i.e., if the axle revolutions per kilometer equals 60 revs/km). If N/v learning is used, it may be possible for VAC to operate without having to rely on feeds of transmission output speed from the transmission.

Alternatively or in addition, N/v may be entered via changing a calibration adjustable parameter or using a service tool during vehicle build.

The current or presently engaged gear ratio of the vehicle transmission (GR) is calculated at functional block 222 of FIG. 7. The GR may be determined using one of a number of possible techniques. In the illustrated embodiment, GR is calculated in real time based on signals from transmission input speed sensors and transmission output speed sensors. In other embodiments, gear ratio may be determined based on the status of diagnostic switches associated with the gears in the transmission gear assembly, which collectively provide an indication of the presently engaged gear ratio. In still other embodiments, gear ratio may be derived based on the engine speed-vehicle speed ratio, assuming the vehicle is moving at a speed sufficient to produce a valid vehicle speed signal.

Once N/v and GR are determined, these values are multiplied together at functional block 224. The product of N/v and GR is then output to functional block 226, where it is multiplied by the MDVA to determine the desired transmission turbine acceleration limit 212.

Figure 6:
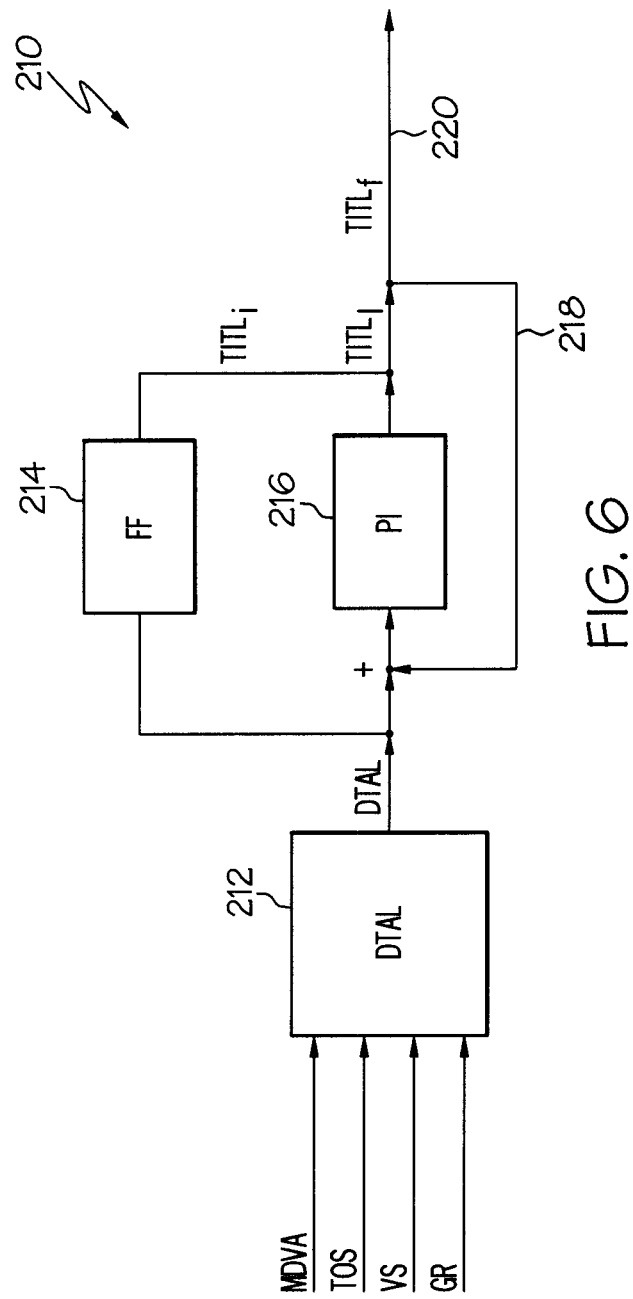
FIG. 6 is a simplified block diagram of a method for managing vehicle acceleration using turbine acceleration control.

DTAL 212 is input to the feedforward component 214 of the VAC as shown in FIG. 6. Feedforward component 214 determines an initial transmission input torque limit TITL(i) through the use of feedforward control logic to respond more quickly to larger changes in desired vehicle acceleration and in some cases 'anticipate' acceleration changes. In general, feedforward component 214 determines a desired transmission input torque limit or TITL based on the desired turbine acceleration or DTAL determined at functional block 212, N/v, transmission torque ratio, and vehicle mass or road load mass using one or more lookup tables. Transmission torque ratio is another term for the gear ratio, i.e., the amount of multiplication that the gear assembly is providing, excluding any multiplication provided by the torque converter. Vehicle mass may be estimated or preconfigured as a default value, e.g., based on the particular vehicle model, anticipated, estimated or actual vehicle load, and/or other factors or a combination of these and other factors.

The vehicle mass value may be adjusted for environmental factors such as road grade or altitude, in which case it may be referred to herein as "road load mass." For example, in one embodiment, vehicle mass and road grade are estimated as follows: a signal-to-noise ratio is calculated based on engine torque signals, vehicle speed signals, and other signals from the transmission control module. If the signal-to-noise ration exceeds a threshold, then a tractive effort of the vehicle is calculated and vehicle mass and road grade are estimated from the tractive effort. If the signal-to-noise ratio does not exceed the threshold then road grade can be estimated from the vehicle mass and the tractive effort. Additional description of one method for estimating vehicle mass and road grade may be found in Kresse, U.S. Patent Application Publication No. 2012-0083980, entitled "System For Selecting A Transmission Economy-Based Shift Schedule", which is incorporated herein by this reference. The vehicle mass or road load mass is represented in kilograms, in the illustrated embodiment.

Figure 10:
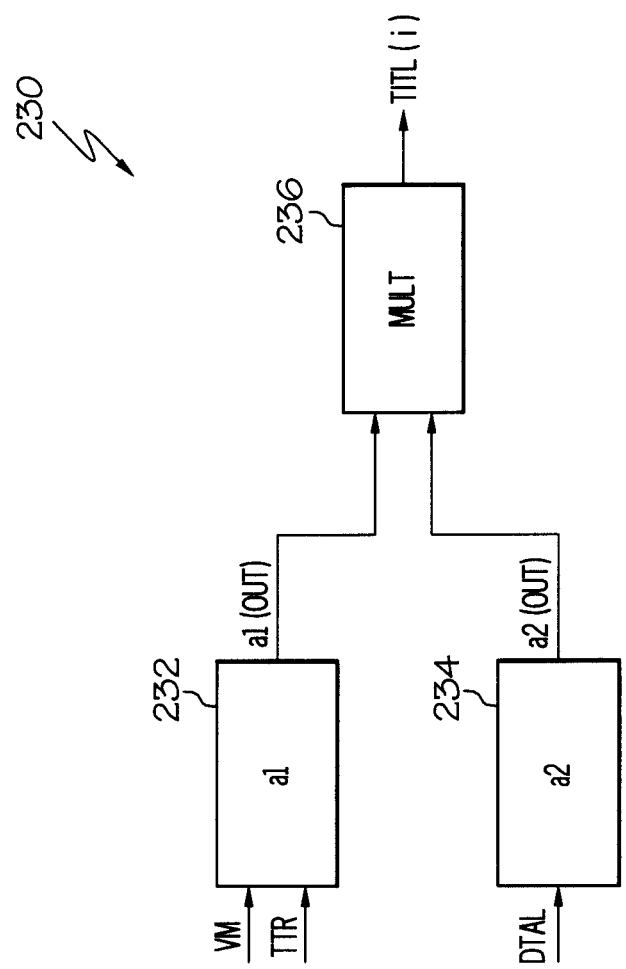
FIG. 10 is a flow diagram illustrating operations executable as part of an embodiment of a feedforward control for vehicle acceleration control using transmission turbine acceleration.

In one embodiment 230, shown in FIG. 10, feedforward component 214 includes computer logic for multiplying a two-dimensional table lookup by a one-dimensional table lookup. In such embodiment, the two-dimensional table, "a1," has independent x1 and x2 axes. In table a1, the x1 axis is vehicle mass or road load mass (i.e., in kg) and the x2 axis is transmission torque ratio (e.g., in Nm), as represented by functional block 232. The one-dimensional table, "a2," has one independent x-axis, which is the desired turbine acceleration or DTAL (e.g., in rpm/sec), as represented by functional block 234. The feedforward torque limit or TITL(i) is determined by the multiplication of the output of the a1 table lookup times the output of the a2 table lookup, as represented by functional block 236.

Figure 11:
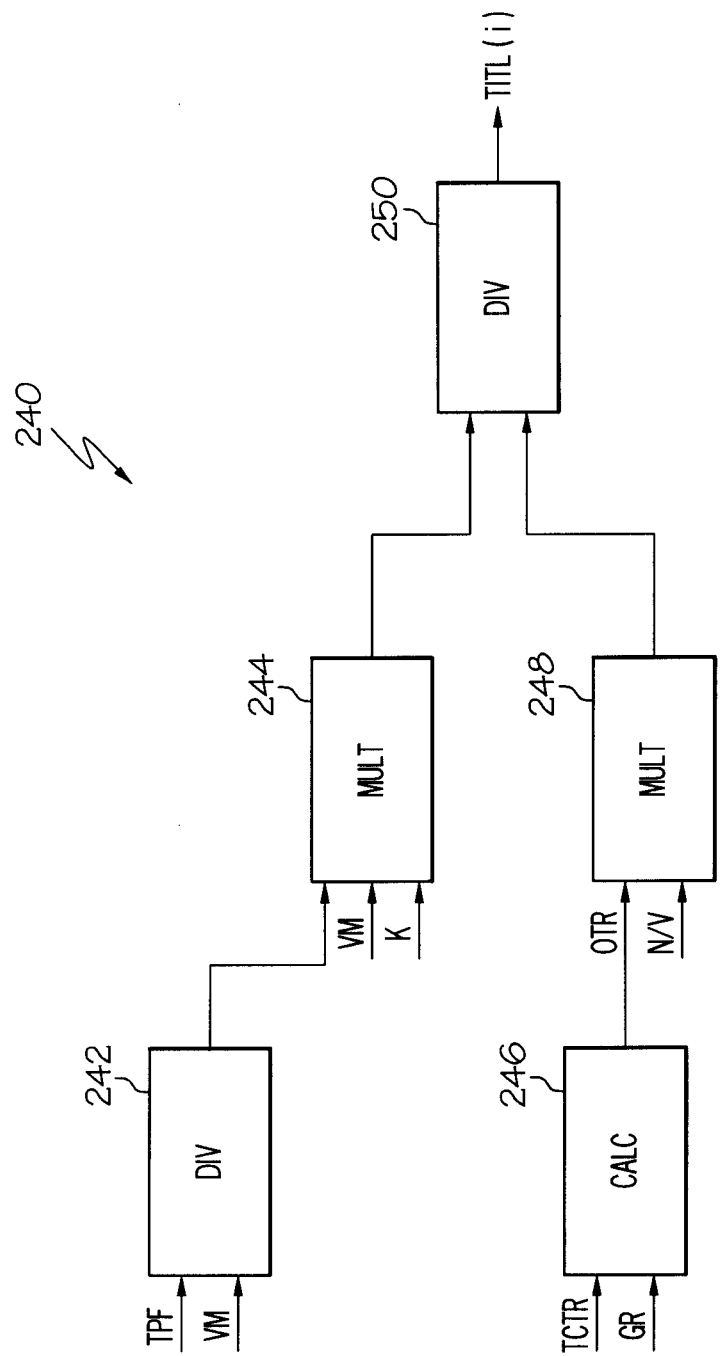
FIG. 11 is a flow diagram illustrating operations executable as part of another embodiment of a feedforward control for vehicle acceleration control using transmission turbine acceleration.

In another embodiment 240 of feedforward component 214, shown in FIG. 11, a mathematical model is used to estimate vehicle acceleration by dividing tire path force by the estimated vehicle mass (or road load mass). Tire path force may be obtained by multiplying engine torque times torque converter torque ratio (if the lockup clutch is not active) times gear ratio times N/v ratio (times a units conversion if needed).

In this model, the feedforward torque limit or TITL(i) is calculated by multiplying the estimated vehicle mass (or road load mass) (e.g., in kg) times the desired vehicle acceleration (as estimated based on tire path force) (e.g. in m/s) times a constant K for units conversion if needed. The resulting product is then divided by the product of the overall transmission ratio times N/v (represented, e.g., in revs/km). The overall transmission ratio includes the current gear ratio or transmission torque ratio plus the torque converter torque ratio. Overall transmission ratio may be obtained by multiplying the torque converter torque ratio (if lockup clutch is not active) times the gear ratio.

It should be noted that in selecting the one more torque limits TITL (e.g., engine torque limit and/or motor torque limit), the type or amount of torque limit selected may change depending on the engine type. For example, if the vehicle uses a diesel engine, long-term limits are generally used. If the vehicle uses a spark ignited engine, or a hybrid engine and motor system, short-term limits may be used alternatively or in addition to the long-term limits to achieve an acceptable limiting response. For example, the values with which the tables a1 and a2 described above are populated may be adjusted based on engine type.

Feedback component 216, 218 includes a proportional integral control wherein actual measured turbine acceleration is compared to the desired turbine acceleration limit and the torque limit output may be adjusted over time based on the error or difference, or based on the amount of the previous adjustment, or based on the difference between the current desired acceleration and the previously desired acceleration.

Some embodiments may also include a derivative term, thereby providing proportional-integral-derivative control. In such embodiments, since the actual measurement signal used by the VAC (i.e. turbine acceleration) is a derivative term itself, the derivative term of the PID control is a second order derivative.

Figure 12:
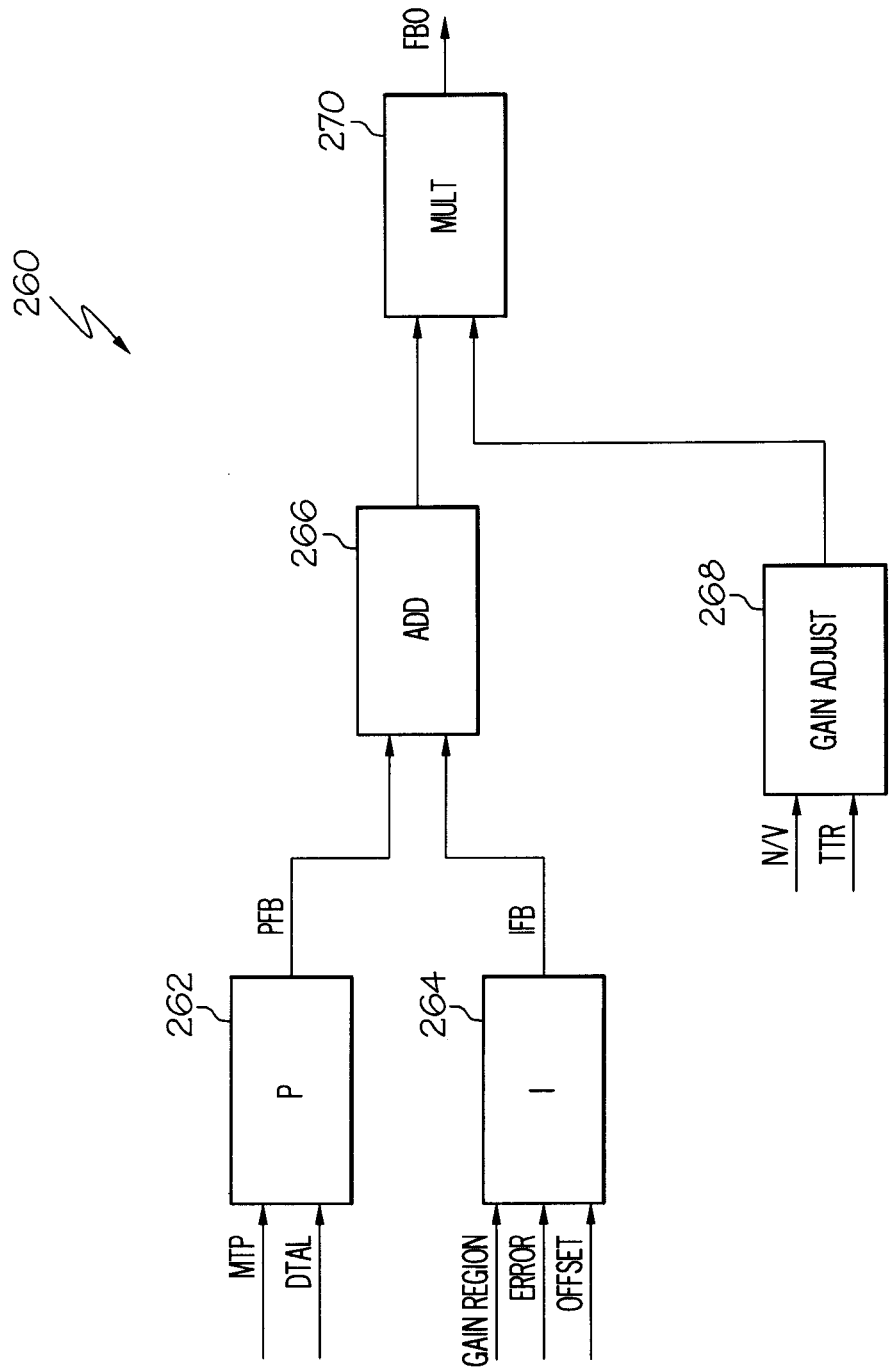
FIG. 12 is a flow diagram illustrating operations executable as part of a feedback control, which may be used in combination with a feedforward control for vehicle acceleration control using transmission turbine acceleration.

FIG. 12 illustrates one embodiment of a proportional integral control 260 that may be used in combination with a feedforward control to manage vehicle acceleration using transmission turbine acceleration. Control 260 includes a proportional control 262, an integral control 264 and a gain adjuster 268.

Proportional control 262 determines the error, i.e., the difference between the actual measured turbine acceleration (MTA) and the desired turbine acceleration (DTAL), and the gain, i.e., the ratio of the change in the actual measured turbine acceleration (MTA) to the change in the desired turbine acceleration (DTAL) over a time interval, and outputs a proportional feedback term PFB, which is the product of the gain times the error. The gain, and/or the error may also or alternatively be output.

Integral control 264 takes the integral of the error over time. In the illustrated embodiment, the integrator is stored it in a 32-bit value or other suitable form to prevent loss of resolution. Integrator output IFB and proportional output PFB are added together at functional block 266. The integrator 264 may be reset upon the occurrence of a gain region change (discussed below). Also, anti-windup logic may be applied to the integrator 264 based on a VAC delay limit or offset.

Loop gain is adjusted on the output of the feedback control 218 at functional block 268 based on N/v and transmission torque ratio. It should be noted that the overall feedback adjustment could be positive or negative due to the use of the feedforward control. In any event, loop gain may be adjusted depending on the error type. The error type is an indicator of how big the error is, for example, if the error is larger, a bigger proportional term is required for fast response. If the error term is relatively small, a smaller proportional term is desired for stability.

In the illustrated embodiment, a multiple-point error table is used, from which one of multiple gain regions is selected based on the error type. For example, if for error type "A" the error is below point 1 then the gain region is set at 1; if the error is above point 2 but below point 3 then the gain region is set at 2; if the error is above point 4 then the gain region is set at 3; and if the error is in between point 1 and point 2 and/or in between point 3 and point 4, then the region may change or stay the same depending upon the previously set gain region. The point values and gain regions may be set differently depending on the error type.

The overall feedback output FBO is determined by multiplying the gain adjust term 268 by the PI output term 266, as shown by functional block 270. FBO is then used to adjust and determine new torque limit values TITL(1), TITL(f).

Figure 13:
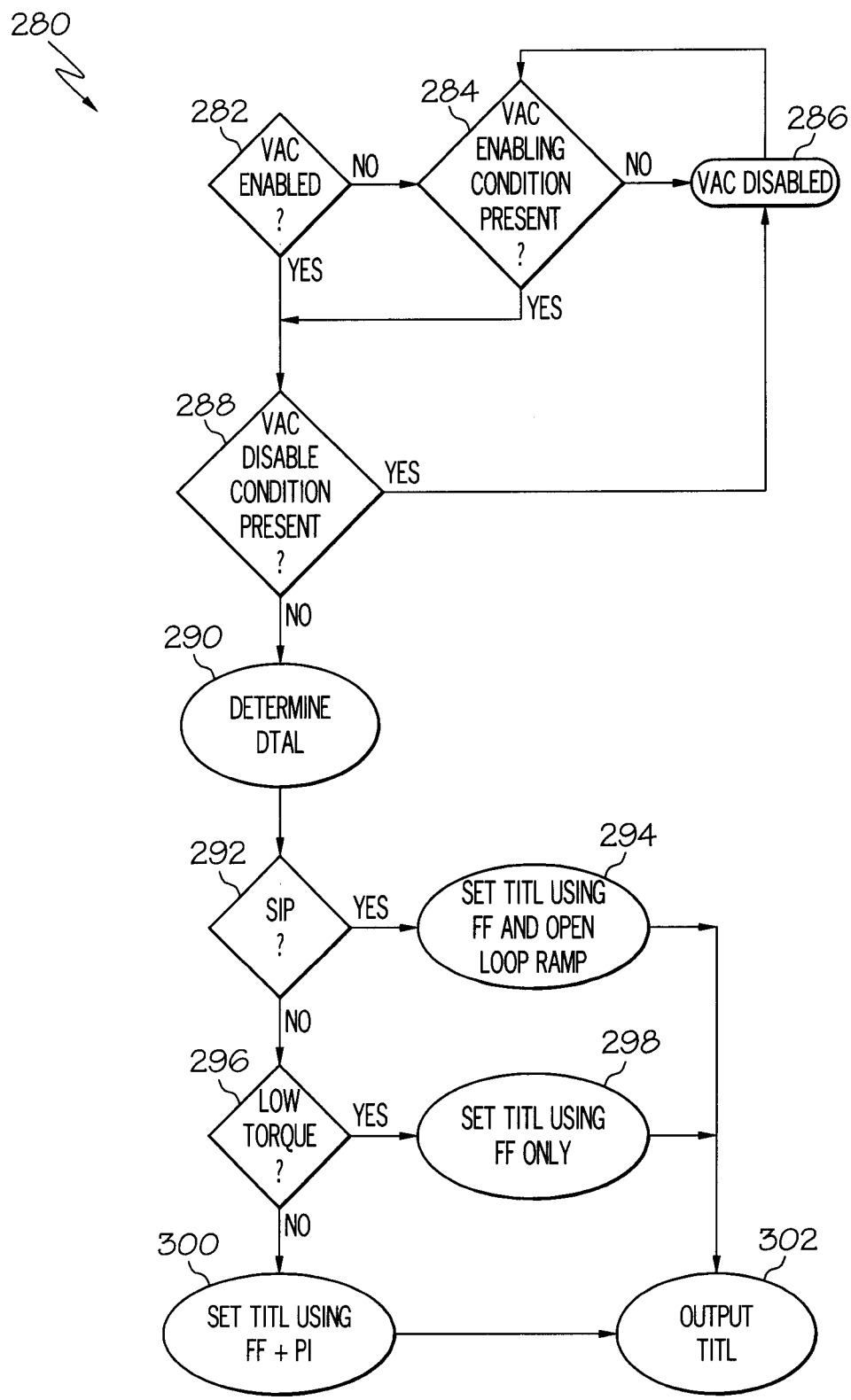
FIG. 13 is a flow diagram illustrating operations executable by a computer, processor or controller to control turbine acceleration to manage vehicle acceleration during vehicle operation.

FIG. 13 is a flow diagram illustrating operations executable by a control module to control turbine acceleration to manage vehicle acceleration. At functional block 282, a determination is made whether the vehicle acceleration control or VAC is currently enabled. The VAC may be manually enabled or disabled (as in, by the vehicle owner or manufacturer) or automatically enabled or disabled (as in, by a computer or control module) based on the occurrence or non-occurrence of a condition. For example, in the illustrated embodiment, VAC is automatically disabled if the vehicle is not in a forward gear, if calibration is needed, or if a fault condition has occurred (such as a sensor failing). The VAC may also be partially disabled if one or more conditions are present, as discussed below.

At functional block 284, if VAC was previously disabled and now an enabling condition is present, VAC is enabled. At functional block 288, if VAC was previously enabled (e.g., the vehicle was traveling in a forward gear) and the control detects the presence of a disabling condition, VAC is disabled.

In the illustrated embodiment, when VAC is enabled, the torque limits TITL are continuously calculated and communicated or broadcast to other vehicle components as described above, regardless of the actual current turbine acceleration. In this way, the only criteria for determining whether to issue the TITL signals is whether VAC itself is enabled. As a result, if the actual measured turbine acceleration MTA is below the desired turbine acceleration limit DTAL, the TITL limit will still be calculated, but since it will be higher than the current actual torque limit, it will be ignored. However, during periods of rapid torque increases (e.g., the driver steps on the accelerator pedal), the TITL limit is more likely to become active to manage acceleration.

As such, if VAC is enabled, the desired turbine acceleration limit DTAL is determined at functional block 290 using the techniques described above with reference to FIGS. 6-9. At functional blocks 292 and 296, a determination is made whether to partially disable the VAC. At functional block 292, a determination is made whether the vehicle is in the progress of shifting from a non-forward gear to forward gear or if a torque converter clutch lockup is in progress. These conditions are detected based on signals received from transmission sensors as described above. If a shift into forward (or request to move the vehicle forward) or lockup is in progress, then the VAC temporarily suspends the feedback control 216, 218 but still executes the feedforward control 214, using the last most previous value of the feedback controller plus the range dependent ramp 268.

Figure 15:
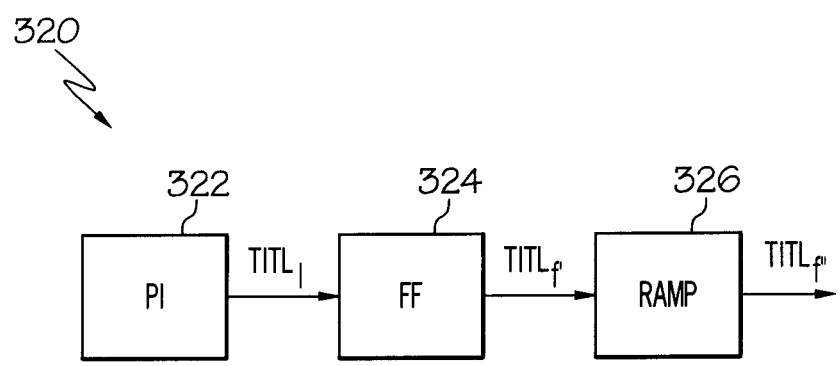
FIG. 15 is a simplified block diagram of a method for managing vehicle acceleration using turbine acceleration control during a shift-in-progress or fluid coupling condition.

A simplified schematic representation of the modified VAC for a shift-in-progress is shown in FIG. 15. The modified VAC 320 is an open loop system receiving TITL(1) output from feedback control 322 into feedforward control 324, which outputs TITL(f'), which is combined with ramp 326 to produce TITL(f'') as shown and described above.

The modified VAC 320 may also be used if a lockup condition is detected, or alternatively, the lockup condition can be ignored and treated as the typical case where both feedforward and feedback terms are being executed.

Figure 14:
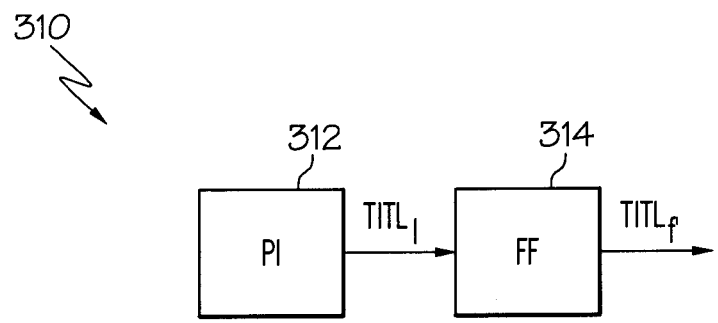
FIG. 14 is a simplified block diagram of a method for managing vehicle acceleration using turbine acceleration control during a low torque condition.

At functional block 296 of FIG. 13, a determination is made whether a low torque condition exists. This condition is detected based on signals received from transmission sensors as described above. If the vehicle is operating in a low torque condition, then at functional block 298, the VAC temporarily suspends the feedback control 216, 218 but still executes the feedforward control 214, using the last most previously outputted value of the feedback controller, but without the range-dependent ramp. A simplified schematic representation of the modified VAC for a low torque condition is shown in FIG. 14. The modified VAC 310 is an open loop system receiving TITL(1) output from feedback control 312 as input into feedforward control 314, which outputs TITL(f') as shown and described above.

If the VAC is not partially disabled due to the presence of a condition such as a shift in progress, lockup, or low torque condition, then at functional block 300 of FIG. 13, the torque limits TITL are determined using the feedforward control 214 and the feedback control 216, 218. In the illustrated embodiment, the feedback control includes the ramp 268.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A transmission for a motor vehicle comprising:
   a torque conversion apparatus couplable to a vehicle mover,
   a gear arrangement operably coupled to the torque conversion apparatus,
   a gear control assembly operably coupled to the gear arrangement, and
   a control module operable to control operation of the transmission, the control module including a processor and circuitry configured to receive a first value representative of a transmission turbine speed, determine a second value representative of a desired transmission turbine acceleration based on the first value, compute at least one torque limit as a function of the second value, and output the torque limit for use by another control module to manage acceleration of the vehicle.

2. The transmission of claim 1, wherein the vehicle mover comprises an engine and a motor, and the control module is configured to compute a first torque limit, output the first torque limit for use by the engine, compute a second torque limit, and output the second torque limit for use by the motor.

3. The transmission of claim 2, wherein the first torque limit for use by the engine and the second torque limit for use by the motor are proportional to the propulsive torque being produced by the engine and the motor, respectively.

4. The transmission of claim 1, wherein the transmission comprises an automatic transmission.

5. The transmission of claim 1, wherein the control module is configured to receive the first value and output the torque limit by a communication link comprising a wireless communication link.

6. The transmission of claim 1, wherein the control module is configured to control operation of both the transmission and the vehicle mover.

7. The transmission of claim 1, wherein the control module is configured to output the torque limit as a vehicle mover torque limit and provide the vehicle mover torque limit directly to the vehicle mover.

8. The transmission of claim 1, wherein the control module is configured to receive inputs from a vehicle mover control module.

9. The transmission of claim 1, comprising a range selector operable to initiate shifting of the transmission from one gear range to another, wherein the control module is operable to automatically initiate a range change in response to a change in vehicle speed.

10. A transmission for a motor vehicle comprising:
    a torque conversion apparatus couplable to a vehicle mover,
    a gear arrangement operably coupled to the torque conversion apparatus,
    a gear control assembly operably coupled to the gear arrangement, and
    a control module operable to control operation of the transmission, the control module including a processor and circuitry configured to receive one or more values representative of a desired transmission turbine acceleration limit, a vehicle gear ratio, and a vehicle mass; compute a torque limit based on the one or more values; and output the torque limit for use by another control module to manage acceleration of the vehicle.

11. The transmission of claim 10, wherein the control module is configured to adjust the value representative of the vehicle mass to include a factor for a road grade.

12. The transmission of claim 11, wherein the control module is configured to estimate the road grade based on the vehicle mass and a tractive effort of the motor vehicle.

13. The transmission of claim 10, wherein the control module is configured to compute the value representative of the desired transmission turbine acceleration limit as a function of a transmission output speed to vehicle speed ratio.

14. The transmission of claim 10, wherein the control module is configured to compute the value representative of the desired transmission turbine acceleration limit by multiplying the gear ratio by the transmission output speed to vehicle speed ratio by a desired vehicle acceleration.

15. The transmission of claim 14, wherein the control module is configured to determine the desired vehicle acceleration by applying a value representative of vehicle speed to a vehicle acceleration curve.

16. The transmission of claim 14, wherein the control module is configured to compute the gear ratio as a function of a transmission output speed and a transmission input speed.

17. A transmission for a motor vehicle comprising:
a torque conversion apparatus couplable to a vehicle mover,
a gear arrangement operably coupled to the torque conversion apparatus,
a gear control assembly operably coupled to the gear arrangement, and
a control module operable to receive data representative of a transmission turbine speed and a current vehicle speed, select a vehicle acceleration mode by determining at least one of whether a request to move the vehicle forward has been received and whether a low torque condition is present, calculate at least one transmission input torque limit based on the selected vehicle acceleration control mode, and output the at least one transmission input torque limit for use by another control module to manage acceleration of the vehicle.

18. The transmission of claim 17, wherein the control module is configured to calculate the at least one transmission input torque limit including a feedforward component and a ramp component in response to a request to move the vehicle forward being received.

19. The transmission of claim 17, wherein the control module is configured to calculate the at least one transmission input torque limit including a feedforward component and not including a ramp component and not including a feedback component in response to a low torque condition being detected.

20. The transmission of claim 17, wherein the control module is configured to calculate the at least one transmission input torque limit including a feedforward component and a feedback component in response to a shift in progress condition not being detected and a low torque condition not being detected.

* * * * *